(No Model.)
P. R. ERLING.
ANIMAL TRAP.
No. 358,924. Patented Mar. 8, 1887.
Fig. 1.
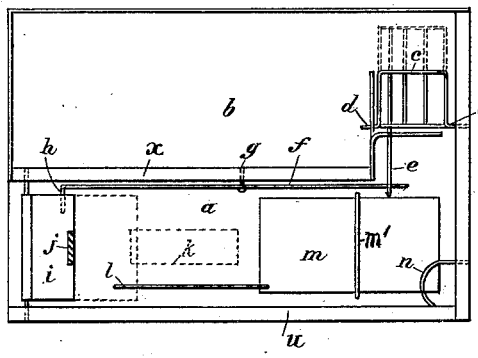
Fig. 3.
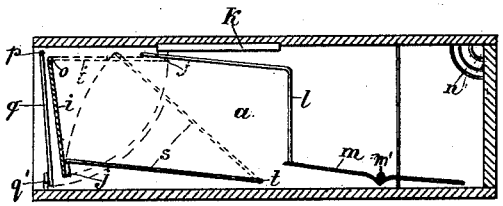
Fig. 2.
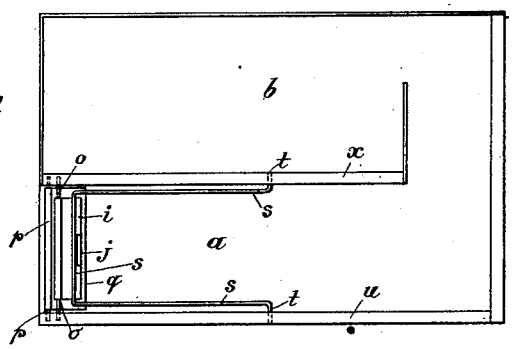
Fig. 4.
Fig. 5.
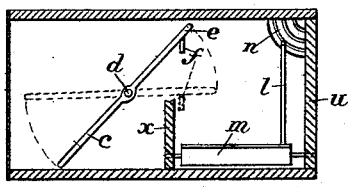
Fig. 6.
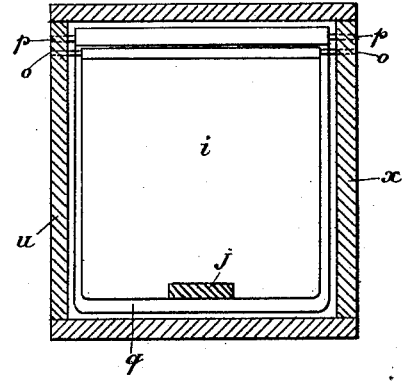
Witnesses:
Chas Baur
Anton Fongner
Inventor:
Peter R. Erling
By Wm Zimmerman
Atty

UNITED STATES PATENT OFFICE.

PETER R. ERLING, OF CHICAGO, ILLINOIS.

ANIMAL-TRAP.

SPECIFICATION forming part of Letters Patent No. 358,924, dated March 8, 1887.

Application filed April 5, 1886. Serial No. 197,754. (No model.)

*To all whom it may concern:*

Be it known that I, PETER R. ERLING, a citizen of the United States, residing at Chicago, in the county of Cook and State of Illinois, have invented certain new and useful Improvements in Animal-Traps, which are fully set forth in the following specification, reference being had to the accompanying drawings, forming a part hereof, and in which—

Figure 1 is a plan view of my trap with the top removed. Fig. 2 is a side elevation of the chamber $a$ with the side removed. Fig. 3 is an end view of the chamber $a$, showing only a part of the internal construction. Fig. 4 is a plan view of the trap, showing more particularly the parts $q$ and $i$ and lock $s$. Fig. 5 shows the rear end of the trap with its parts. Fig. 6 shows a cross-section of the part $a$ just back of the door and the frame $q'$, and door $i$ closed.

Like letters refer to like parts.

The object of my invention is to produce an animal-trap in which a single magnet, in combination with a magnetic door released by the force of a lever operated by the entrapped animal, is employed, and in which the said door, in combination with a lever or levers and a second door leading out from said entrapping-chamber into another chamber forming a part of the trap, shall, by the efforts of the entrapped animal, become self-setting and self-locking, in the manner substantially as hereinafter set forth.

To attain said end, I construct my trap as follows, namely: The said trap is divided longitudinally into two chambers, $a$ $b$, of which one is provided with a door, $i$, swinging on hinges $o$ at its upper edge. Said hinges may be attached directly to the trap, or, preferably, to a frame, $q$, on the inner side thereof, and then said frame may be attached on hinges or pivots $p$ in the same manner as said door would have been, and the said door will then when closed rest against said frame, and said frame will be held on the outside with any suitable stop, $q'$, which may be so arranged as to be adjustable, so that said frame $q$, with its door $i$, may swing outward or inward on hinges $p$ at pleasure. Said door $i$ is provided with an armature, $j$, at its lower edge, or, if preferred, is made of iron or other magnetic material, and to the deck of the trap is attached a permanent magnet, $k$, of sufficient strength to barely hold the magnet or door $j$ when brought in contact with it.

A lever, $l$, from the treadle $m$, placed alongside one of the walls of the trap, reaches over the upper side of the door $i$, and by means of it the door is released from the magnet by the weight of the animal on the treadle to which the lever $l$ is attached. The treadle, being pivoted at $m'$, is thereby caused to come down, and with it the outer end of said lever $l$, and through it the door $i$ is closed. A bait-basket provided with bait is hung in the rear end of the chamber, which is not connected with any of the mechanism therein, to induce the animal to walk upon the treadle $m$. The bait is so secured as not to be accessible by the animal.

To the partition $x$ is attached on a fulcrum, $g$, the lever $f$, having a hook, $h$, at its front end, passing by the edge of and around to the front side of the door, against which the door strikes, and which serves to hold the door from opening outward, and also to open said door when that end of the lever is raised.

At the rear end of the trap is a door, $c$, through the partition $x$, opening outward on pivots $d$, and which has above said hinges a lever, $e$, which rests upon the upper edge of the lever $f$. When the lower end of the door is raised, the arm $e$ depresses the lever $f$ at that end and raises the other end thereof, which, by means of the hook $h$, raises the door $i$ into contact with the magnet $k$.

The door $c$ is made of wire or other openwork, and placed in the inclined position shown. The light will induce the entrapped animal to seek to escape through said door, which, through slight efforts, will yield and permit it to escape into the chamber $b$, from which it cannot return, and in passing through said door $c$ the lever $f$ will be moved, as shown by the dotted lines, and the trap will be reset.

A brace, $s$, in the shape of a bail, fastened with its ends $t$ to the bottom or sides, as $x$, of the trap, and resting upon the door $i$ when open, forms an automatic lock to the door $i$. Said lock $s$ is fastened to the lever $f$ by a chain, $s'$, through which it is raised to unlock and open the door.

The frame $q$ swings outward for the purpose of reaching the hand into the trap in a more convenient manner.

The operation of the trap is as follows, namely: The animal enters at the door $i$, and in endeavoring to get at the bait $n$ steps upon the treadle $m$ and depresses its front part, and with it the lever $l$, and thus releases the door $i$. Then, as before stated, he passes into the apartment $b$ through the door $c$, and in lifting the door the lever $e$ is depressed, and with it the lever $f$ at that end, which said lever turning on its fulcrum at $g$ raises the other end of said lever, and through it the door is raised and brought in contact with the magnet $k$ and the trap is set, the door $c$ and outer end of lever $f$ falling to their lowest position as soon as the animal has passed through the door $c$. The upward motion of the lever $f$ also carries with it the brace or lock $s$ by means of the connecting-chain $s'$.

It may also be necessary to observe that the walls of the chamber $b$ are preferably made of open wire-work, so as to give the light to induce the animal to seek escape in that direction; or, if the walls are made of boards, a window should be placed opposite the door $c$.

What I claim is—

1. In an animal-trap, an automatically-closing door provided with an armature, in combination with a single magnet, lever, and treadle operating to release said armature, substantially as specified.

2. The hinged door-frame $q$ and automatically-closing door $i$, provided with armature, in combination with a magnet, $k$, and lever and treadle to release said door, substantially as specified.

3. An automatically-closing door provided with an armature and locking brace or lock, $s$, in combination with a magnet and lever and treadle to release said armature, substantially as specified.

4. In combination with a trap divided into two compartments, an automatically-closing door provided with an armature held by a magnet in the deck of the trap, from which the door is released by a lever and treadle, and provided with a door, $c$, lever $f$, and mechanism through which said armature and magnet become united, substantially as specified.

5. In combination with the four sides of a trap, an end frame, $q$, arranged to swing on hinges and held by a stop, and provided with a door, $i$, substantially as specified.

6. In combination with a door, $i$, closing by gravity, a lock, $s$, in the form of a bail, the sides or arms of which pass beyond the sides of and placed on the interior of the door, substantially as specified.

PETER R. ERLING.

Witnesses:
WM. ZIMMERMAN,
ALVA A. KNIGHT.